(12) United States Patent
Kim (10) Patent No.: US 7,004,394 B2
(45) Date of Patent: Feb. 28, 2006

(54) PORTABLE TERMINAL CAPABLE OF INVOKING PROGRAM BY SIGN COMMAND AND PROGRAM INVOKING METHOD THEREFOR

(75) Inventor: Tae-Hoon Kim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 10/781,519

(22) Filed: Feb. 17, 2004

(65) Prior Publication Data

US 2004/0188529 A1   Sep. 30, 2004

(30) Foreign Application Priority Data

Mar. 25, 2003   (KR) .................... 10-2003-0018434

(51) Int. Cl.
   *G06K 7/10*   (2006.01)
(52) U.S. Cl. ................ 235/472.01; 235/439; 382/181; 382/186; 382/187; 345/173
(58) Field of Classification Search ............... 382/181, 382/182, 186, 187; 235/379, 380, 472.01; 345/173, 181–184

See application file for complete search history.

(56) References Cited

U.S. PATENT DOCUMENTS

| | | | |
|---|---|---|---|
| 5,410,612 A * | 4/1995 | Arai et al. ................... | 382/187 |
| 5,454,046 A * | 9/1995 | Carman, II ................. | 382/186 |
| 5,502,803 A * | 3/1996 | Yoshida et al. ............. | 715/530 |
| 5,550,930 A * | 8/1996 | Berman et al. ............. | 382/187 |
| 5,612,719 A * | 3/1997 | Beernink et al. ........... | 345/173 |
| 5,781,663 A * | 7/1998 | Sakaguchi et al. .......... | 382/189 |
| 6,057,845 A * | 5/2000 | Dupouy ...................... | 715/863 |
| 6,147,314 A * | 11/2000 | Han et al. .................... | 200/5 A |
| 6,249,606 B1 * | 6/2001 | Kiraly et al. ............... | 382/195 |
| 6,295,372 B1 * | 9/2001 | Hawkins et al. ............ | 382/187 |
| 6,298,146 B1 * | 10/2001 | Ilan et al. .................... | 382/115 |
| 6,298,147 B1 * | 10/2001 | Ilan et al. .................... | 382/119 |
| 6,463,304 B1 * | 10/2002 | Smethers .................... | 455/566 |
| 6,504,956 B1 * | 1/2003 | Gannage et al. ............ | 382/188 |
| 6,507,336 B1 * | 1/2003 | Lunsford .................... | 345/168 |
| 6,539,113 B1 * | 3/2003 | Van Kleeck ................ | 382/185 |
| 6,636,203 B1 * | 10/2003 | Wong et al. ................ | 345/173 |
| 6,668,081 B1 * | 12/2003 | Ilan et al. .................... | 382/187 |
| 2002/0063678 A1 * | 5/2002 | Wong ......................... | 345/156 |
| 2002/0163544 A1 * | 11/2002 | Baker et al. ................ | 345/835 |
| 2003/0099398 A1 * | 5/2003 | Izumi ......................... | 382/186 |
| 2003/0191960 A1 * | 10/2003 | Hung-yi ...................... | 713/200 |
| 2004/0001051 A1 * | 1/2004 | Tomizawa et al. .......... | 345/173 |
| 2004/0145574 A1 * | 7/2004 | Xin et al. .................... | 345/173 |
| 2004/0188529 A1 * | 9/2004 | Kim ....................... | 235/472.01 |
| 2004/0223647 A1 * | 11/2004 | Blount et al. ............... | 382/189 |

(Continued)

OTHER PUBLICATIONS page 43, Handbook for Palm m100 Series Handhelds (www.palmone.com/us/support/handbooks/m125_ug_US.pdf) .*

*Primary Examiner*—Karl D. Frech
*Assistant Examiner*—Daniel Walsh
(74) *Attorney, Agent, or Firm*—Dilworth & Barrese, LLP (57) ABSTRACT

A portable terminal capable of invoking programs by a sign command and a program invoking method therefore. In the portable terminal, a storage stores programs and symbols linked to the programs. A display displays the operation state of a program when the program is invoked. A user interface senses an external contact and informs a controller that detects a figure represented by a signal sensed at the user interface according to a path in which the external contact is made and, in the presence of a symbol matching the figure, invokes a program corresponding to the symbol from the storage.

17 Claims, 8 Drawing Sheets

U.S. PATENT DOCUMENTS

2004/0240739 A1* 12/2004 Chang et al. ................ 382/186
2004/0263487 A1* 12/2004 Mayoraz et al. ............ 345/173
2005/0024341 A1*  2/2005 Gillespie et al. ............ 345/173
2005/0041865 A1*  2/2005 Zhen et al. .................. 382/187
2005/0063592 A1*  3/2005 Li et al. ..................... 382/181
2005/0111736 A1*  5/2005 Hullender et al. .......... 382/188

* cited by examiner

| ▼ CAMERA | ▼ DIRECTORY | ▼ INTERNET | ▼ SEARCH |
|---|---|---|---|
| ▼ BACK | ▼ FORWARD | ▼ HOME | ▼ MESSAGE |
| ▼ SCHEDULER | ▼ PHONE | ▼ VOICE MEMO | ▼ MEMO |
| ▼ PAGE DOWN | ▼ USER-DEFINED | ▼ USER-DEFINED | ▼ USER-DEFINED |

PORTABLE TERMINAL CAPABLE OF INVOKING PROGRAM BY SIGN COMMAND AND PROGRAM INVOKING METHOD THEREFOR

PRIORITY

This application claims priority under 35 U.S.C. § 119 to an application entitled "Portable Terminal Capable of Invoking Program By Gesture Command and Program Invoking Method Therefor" filed in the Korean Intellectual Property Office on Mar. 25, 2003 and assigned Serial No. 2003-18434, the contents of which are incorporated herein by reference.

BACKGROUND OF THE INVENTION

1. Field of the Invention

The present invention relates generally to a portable terminal and a program invoking method therefor, and in particular, to a portable terminal capable of invoking a program using a hot key and a program invoking method therefor.

2. Description of the Related Art

A portable terminal is a portable device that provides wireless communication service to a user through radio communication with a base station (BS). This portable terminal has become popular with users all over the world irrespective of their age. It is now a necessity of daily living. The portable terminal includes a transmitter/receiver, a data input/output device, and an antenna, for exchanging voice or other data.

Figure 1:
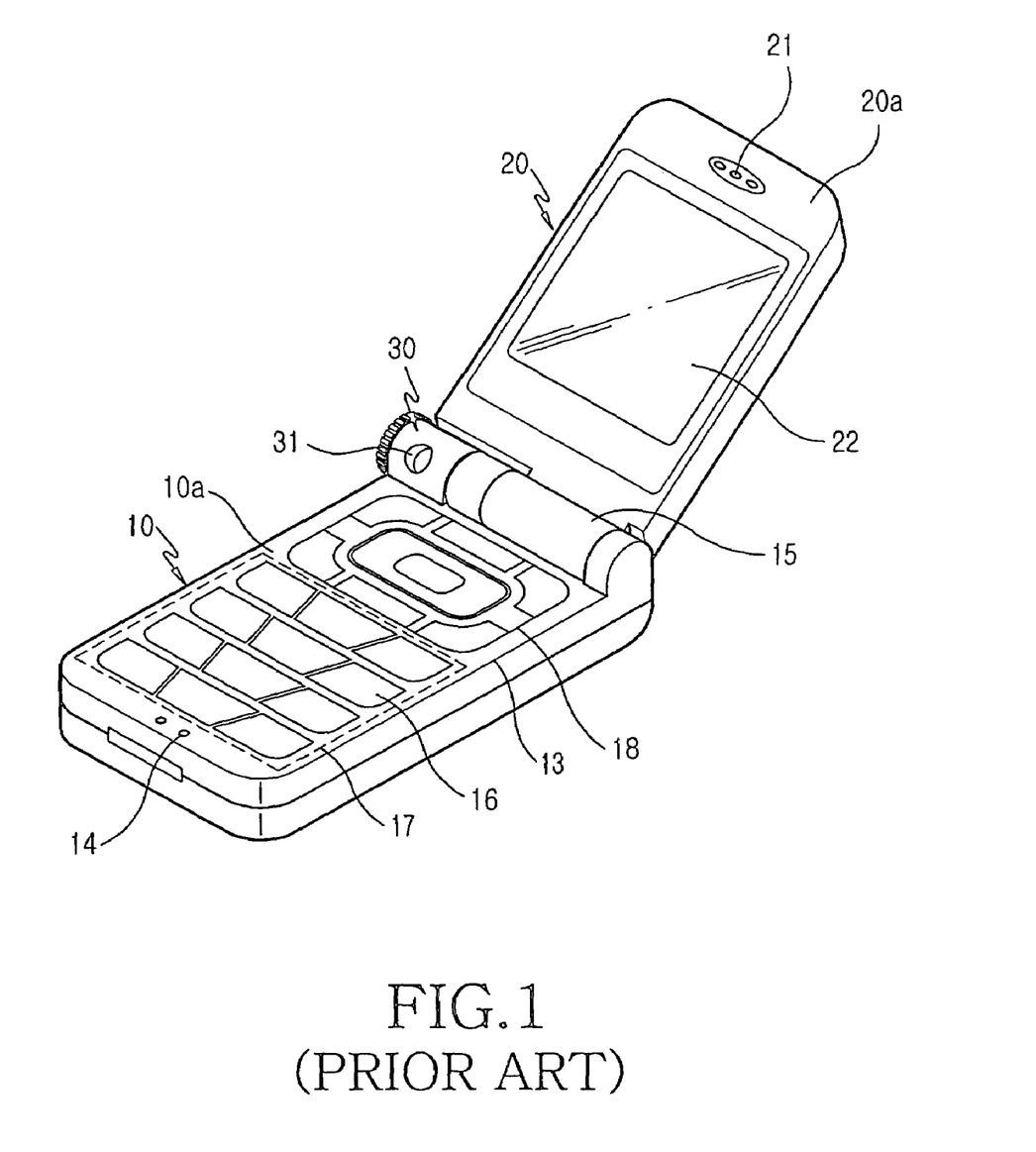
FIG. 1 illustrates a typical folder-type terminal of the prior art.

FIG. 1 illustrates a typical folder-type terminal. Referring to FIG. 1, the folder-type terminal has two housings rotatably connected by a hinge device. The two housings are a main housing 10 and a folder 20. The folder-type terminal is comprised of the main housing 10, the folder 20, the hinge device 15 for connecting the main housing 10 to the folder 20 such that the folder 20 can rotate to an opened and/or closed position with respect to the main housing 10, and a lens housing 30 rotatably mounted on the hinge device 15.

The main housing 10 has a keypad 13 with a plurality of keys 16 and a microphone 14 on its front surface 10a of the main housing 10. The keypad 13 is divided into an alpha-numeric key portion 17 having a plurality of numeric keys 16 for entering digits or characters and conducting a conversation session with another party using a similar terminal. The keypad 13 further includes a function key portion 18 having select keys for invoking stored programs and setting environment. The select keys will be described below. Although in the preferred embodiment two key sections 17 and 18 are shown, it should be understood by those skilled in the art that functionality performed by key sections 17 and 18 may be performed by only one of these sections.

The folder 20 includes a speaker 21 and a display, i.e., a liquid crystal display (LCD) module 22 on its bottom surface 20a. The lens housing 30 is comprised of a camera lens 31 and a charge coupled device (CCD: not shown) for providing power. The lens housing 30 is disposed coaxially with the hinge device 15 and thus rotates upon the hinge axis of the hinge device 15.

Figure 2:
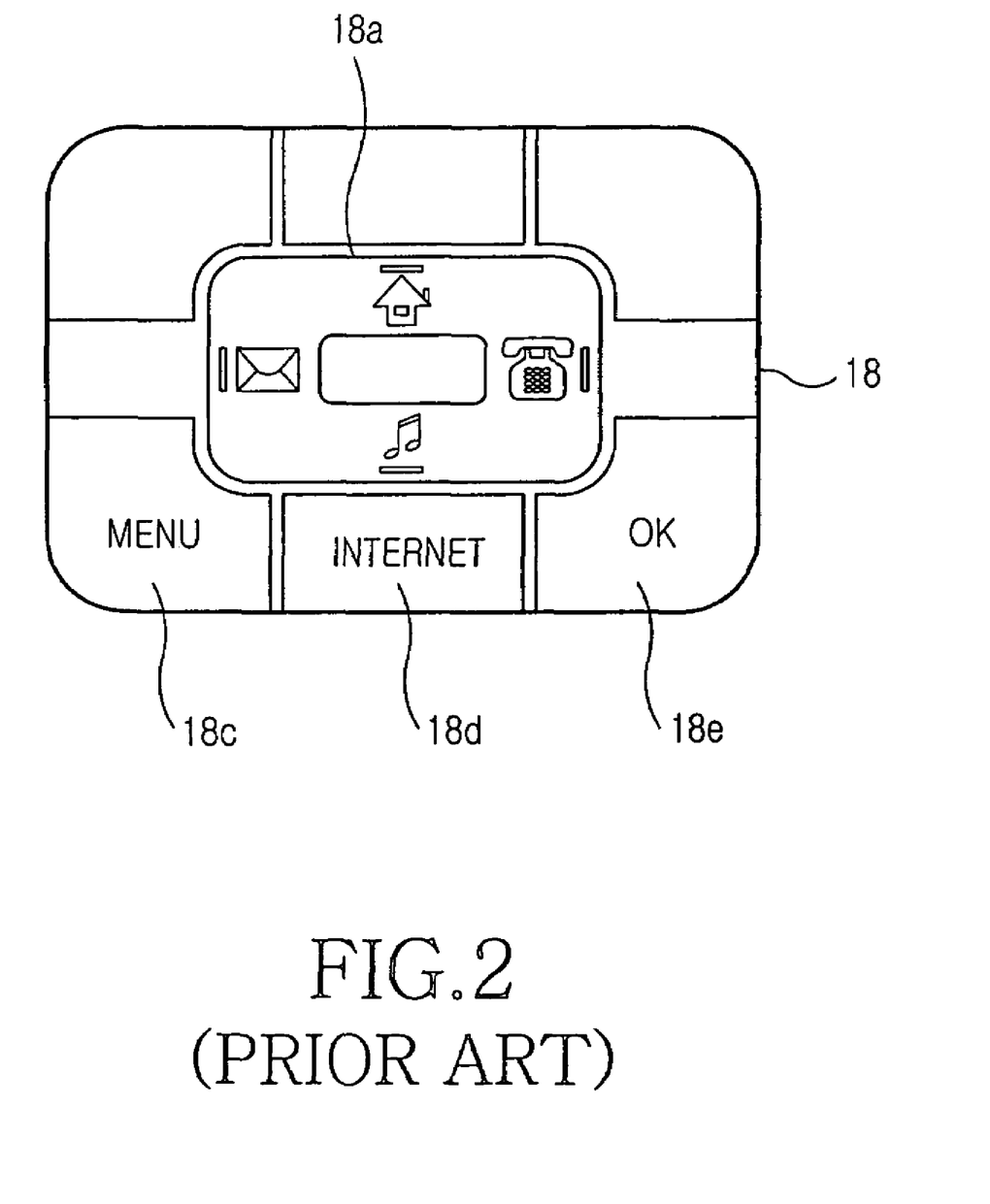
FIG. 2 is a plan view of a function key portion of a typical folder-type terminal of the prior art illustrated in FIG. 1.

FIG. 2 shows the function key portion 18 illustrated in FIG. 1. The function key portion 18 includes setting keys 18a, a MENU key 18c, an INTERNET key 18d, and an OK key 18e. The setting keys 18a include select keys for rapid invocation of a program and environment setting for the programs executing on the terminal of the present invention.

The program will be discussed below. The select keys 18a co-function as scroll keys for moving a pointer displayed on the LCD module 22 in four directions to select an intended character after the program is invoked. With these setting keys 18a, a program is easily and rapidly selected.

The MENU key 18c is used to display the icons of specific programs on the LCD module 22, for settings of the programs and registration of new programs. The INTERNET key 18d selects a stored Internet browser program and manages a wireless Internet connection. The OK key 18e is used to indicate approval of program functions, actions, and to update data.

The portable terminal provides hot keys to rapidly and easily invoke various programs stored on the portable terminal displayed on FIG. 1. The use of a hot key allows invocation of a corresponding application programs using one or two key strokes without a complicated menu selection. The Palm Personal Digital Assistant (PDA), which is a great commercial success, offers four hot keys to run stored programs in a more user-friendly fashion. Now, most PDAs provide four hot keys. If more hot keys are made available on the portable terminal, such keys will provide more convenience. However, the number of hot keys is limited by the restricted small size of the portable terminal.

U.S. Pat. No. 5,596,656 issued to Xerox discloses a technique of selecting and displaying a text using symbols mapped to characters.

Figure 3:
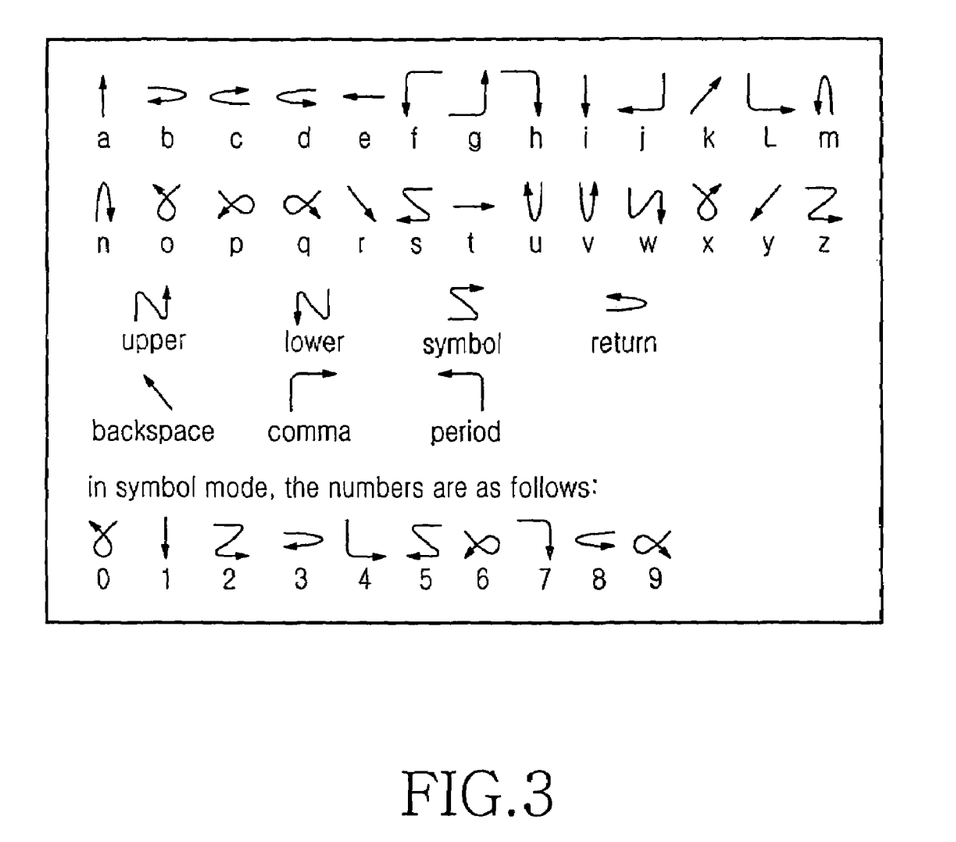
FIG. 3 illustrates an exemplary text-symbol table listing symbols mapped to characters.

FIG. 3 illustrates an example of a text-symbol table listing symbols mapped to characters. To display an intended character, a symbol corresponding to the character is drawn in a predetermined portion of a user interface in the terminal. Despite the advantage of simple character display, this method is confined to characters and thus hot keys are required in software or hardware to run programs. Moreover, a user must memorize all the symbols for the characters to use the above text selection method, which, as easily surmised from FIG. 3, is not an easy task. Furthermore, symbols are drawn on the user interface with a pen-type device with a sharp tip in order to enter a text. This implies that the portable terminal must be equipped with this input device to use the functionality.

SUMMARY OF THE INVENTION

It is, therefore, an object of the present invention to provide a portable terminal capable of invoking stored programs more rapidly and more easily and a program invoking method therefor.

It is another object of the present invention to provide a portable terminal capable of easily selecting a program according to a set program selection function without monitoring or checking a menu changes on a display and a program invoking method therefor.

The above objects are achieved by a portable terminal capable of invoking a program by a sign command and a program invoking method therefore. In the portable terminal, a storage stores programs and symbols linked to these programs. A display displays the operation state of a program when the program is invoked. A user interface senses an external contact by the user. A controller detects a figure represented by a signal sensed at the user interface according to a path in which the external contact is made and, in the presence of a symbol matching the figure, invokes a program corresponding to the symbol.

It is preferred that the symbols are mapped to the appellations of the programs in a program execution table. The storage can have a plurality of program execution tables and different programs can be invoked using the same symbol in different program execution tables. The symbols can be user-defined.

The user interface is comprised of a touch pad, a touch screen, and a membrane coated on keys for key input, for sensing the external contact. It is preferred that the display displays the operation state of a program invoked by the controller, and the controller controls the display to display a symbol linked to the program for a predetermined time and then invokes the program. Upon receipt of a sign command represented by a symbol linked to a different, dormant program from the user interface during an ongoing program, the controller stores information about the operation state of the ongoing program and data generated from the ongoing program in the storage and executes the different program. The controller determines whether the figure falls within a predetermined matching range of the symbol to check whether the figure matches the symbol.

In a program invoking method for the portable terminal, it is determined whether (a) an external contact has been sensed,
(b) a figure represented by a sensed signal is detected according to a path in which the external contact is made, upon sensing the external contact,
(c) the figure is compared with symbols linked to stored programs, and
(d) a program corresponding to a symbol is invoked from the storage if the symbol matches the figure.

It is preferred that the symbols are mapped to the appellations of the programs in a program execution table. The symbols are listed in a plurality of program execution tables and can be user-defined.

It is also preferred that upon receipt of a sign command represented by a symbol linked to a different, dormant program from the user interface during the ongoing program in step (d), information about the operation state of the ongoing program and data generated from the ongoing program are stored in the storage and the different program is invoked. It is determined whether the figure falls within a predetermined matching range of the symbol in step (c).

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 4:
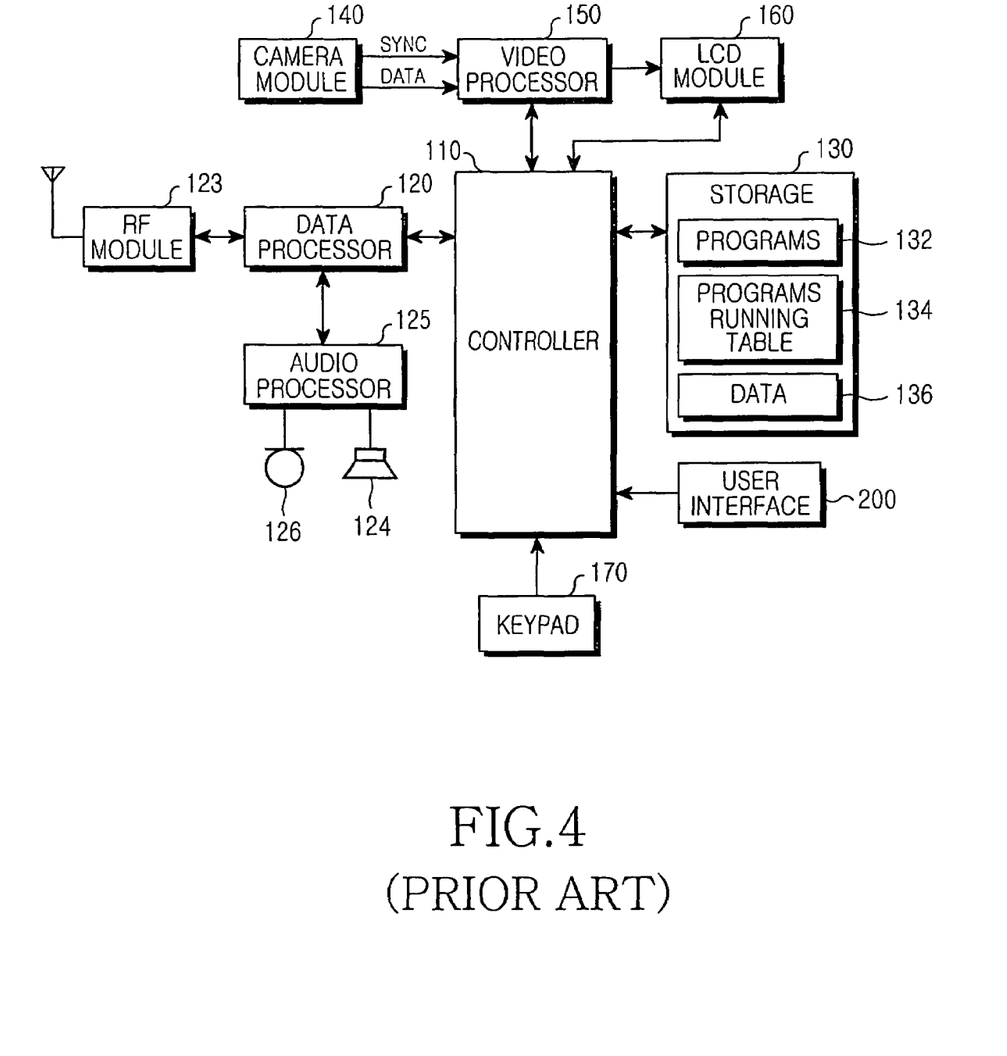
FIG. 4 is a block diagram of a portable terminal capable of selecting programs using a symbol representing a sign command according to a preferred embodiment of the present invention.

FIG. 4 is a block diagram of a portable terminal capable of selecting a program using a symbol representing a sign command, the portable terminal includes a radio frequency (RF) module 123 for wireless communication in the portable terminal. The RF module 123 includes an RF transmitter for up-converting the frequency of a transmission signals and amplifying it and an RF receiver for amplifying a received signal with low noise and down-converting its frequency. A data processor 120 may comprise a MODEM for coding and modulating a signal received from the RF module 123 and a CODEC for demodulating and decoding a signal to be transmitted via the RF module 123. The CODEC includes a data CODEC for processing packet data and an audio CODEC for processing audio signals. An audio processor 125 reproduces audio signals received from the audio CODEC via a speaker 124 and transmits an audio signal received by a microphone 126 to the audio CODEC.

A camera module 140 photographs objects captured through a lens 31(FIG. 1). The camera module 140 is comprised of a camera sensor for converting the optical signal to an electrical signal, and a signal processor for digitizing an analog video signal received from the camera sensor. Here, the camera sensor can be a CCD sensor and the signal processor can be a digital signal processor (DSP). A video processor 150 generates video data from the video signal received from the camera 140, processes the video signal on a per frame basis and outputs frame video data, according to the resolution and size, to an LCD module 160. The video processor 150 includes a video CODEC for compressing the frame video data in a predetermined method and restoring compressed frame video data to original frame video data. A JPEG CODEC, MPEG4 CODEC, or Wavelet CODEC among others may be used as the video CODEC. It is assumed herein that the video processor 150 is provided with an on screen display (OSD) functionality and can output video data and OSD data in combination under the control of a controller 110.

The LCD module 160 displays the video data received from the video processor 150 and user data received from the controller 110 on an LCD. The LCD module 160 may include an LCD controller, memory for storing video data, and the LCD. If the LCD-module 160 is implemented as a touch screen, it can serve as an input device. The present invention is also applicable in cases where the LCD module 160 serves as an input and output device like a touch screen.

A storage 130 includes program memory and data memory. The program memory stores programs 132 for controlling the whole operation of the portable terminal and the data memory stores data 136 generated during execution of the programs 132. In accordance with the present invention, the storage 130 has a program execution table 134 that lists symbols preset to run the programs 132 mapped to the appellations of the programs 132.

A keypad 170 includes a plurality of keys for entering characters and digits according to an input mode. Upon input of a key in the keypad 170, the controller 110 displays a character or digit corresponding to the key on the LCD module 160. A user interface 200 provides an interface for entering program executing commands. The user interface 200 can be a touch pad, a touch screen, etc. Here, it is assumed that the touch pad is used as the user interface. The user interface 200 senses an external signal and forwards the signal to the controller 110.

The controller 110 provides overall control of the portable terminal. The above-described stand-alone data processor 120 can be integrated into the controller 110. This controller 110 interprets a command corresponding to a sensed signal from the user interface touch pad 200 and invokes a corresponding program from the storage 130. It is preferred that the controller 110 detects a figure represented by the sensed signal. The controller 110 then compares the figure with the shapes of symbols in the program executing table. If there is any symbol matching the figure, the controller 110 detects the appellation of a program corresponding to the symbol from the program executing table 134 and invokes the appropriate program from among the stored programs 132. The invocation and running state of the program is visually notified on the LCD module 160. Preferably, the controller 110 displays the symbol on the LCD module 160 for a predetermined time when the program is invoked by the symbol or by general menu selection. This improves the user's memory about hot key symbols for running the programs and increases the utilization of the hot key symbols.

Upon receipt of a sensed signal corresponding to another hot key symbol during execution of a program (hereinafter, a first program), the controller 110 stores information about the running state of the first program and data generated from the first program in the storage 130 and then invokes a second program corresponding to the sensed signal.

Upon receipt of a sensed signal corresponding to the hot key symbol for the first program during the second program in progress, the controller 110 stores information about the running state of the second program and data generated from the second program in the storage 130 and then resumes the first program in such a state as it was suspended according to the stored execution state information, displaying the data generated from the first program.

It is preferred that the controller 110 invoke a plurality of application programs by respective corresponding sign commands, while storing information about the operation state of an ongoing program and data generated during execution of the program in the storage 130, so that the stored program is resumed in the operation state by a sign command or a general menu selection.

The touch pad as the user interface 200 senses an external touch (contact) signal and functions as a select key for environment setting and moving a cursor. Thus, the touch pad can be used to invoke a program by a hot key symbol, set an environment, and move the cursor. The touch pad operates differently depending on a contact mode or a select mode.

The configuration illustrated in FIG. 4 is applicable to any terminal capable of invoking a program using symbols, such as a cellular phone, a digital phone, a PDA, a hand-held phone, and a laptop computer. The present invention is also applicable to all types of portable terminals including a bar type, a flip type, and a folder type. For clarity of description, the present invention is described in the context of a folder-type terminal.

Figure 5:
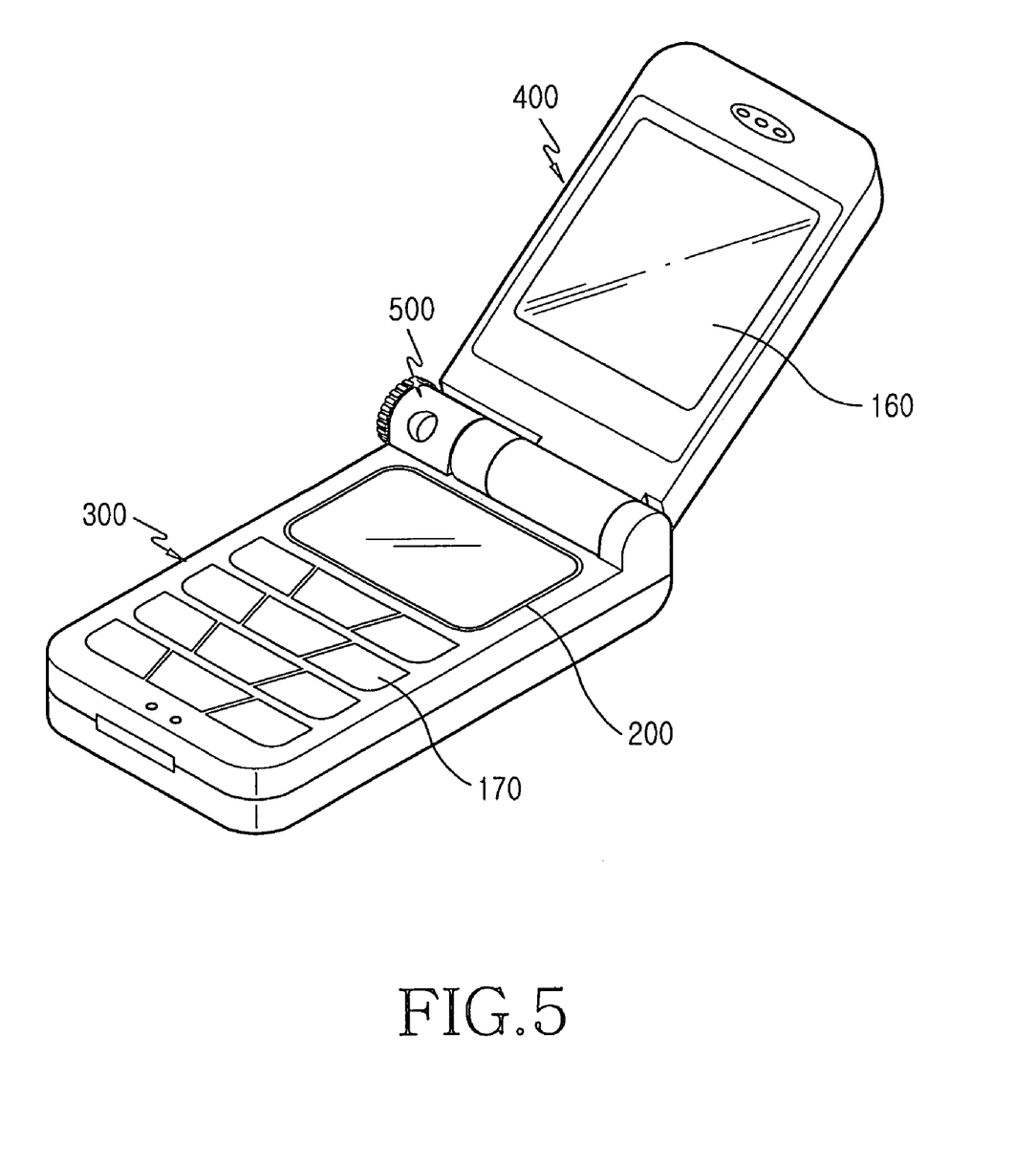
FIG. 5 illustrates a folder-type portable terminal configured according to a preferred embodiment of the present invention as illustrated in FIG. 4.

FIG. 5 illustrates a folder-type terminal having the configuration compatible with functionality outlined above with reference to FIG. 4. The terminal of FIG. 5 includes a folder 400 rotatably connected to a main housing 300 so that the folder 400 is opened or closed with respect to the main housing 300 of the portable terminal. The main housing 300 includes the function key portion 170 and the user interface 200. The folder 400 includes an LCD module 160. A camera module 500 is further provided.

Programs are invoked by a symbol corresponding to an individual program, entered through the user interface 200 and its state is displayed on the LCD module 160. The portable terminal displays the symbol on the LCD module 160 for a predetermined time in accordance with the present invention to allow the user to memorize the hot key for the program.

Figure 6:
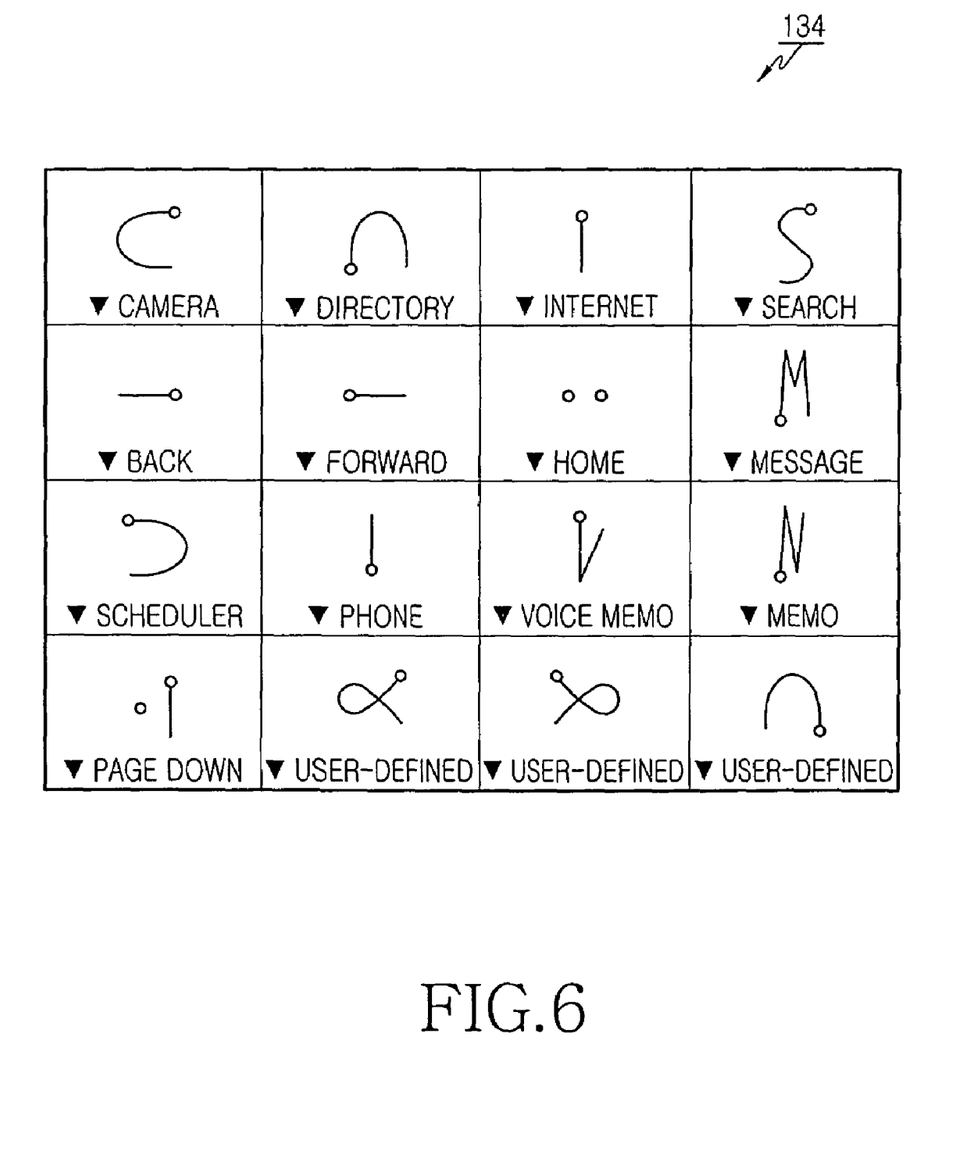
FIG. 6 illustrates an exemplary program execution table for the portable terminal of the preferred embodiment of the present invention illustrated in FIG. 4.

FIG. 6 illustrates an example of the program execution table 134, the appellations of the programs 132 stored in the storage 130 illustrated in FIG. 4 are mapped to their respective symbols in the program execution table 134. Please note, "o" indicates a starting point to write a symbol from, a sign is drawn from the starting point to represent a symbol. Upon sensing drawing of a line through a touch on the user interface 200, that is, upon receipt of a sign command, the controller 100 of FIG. 4 compares a figure represented by the sign command with the symbols in the program execution table. Symbols reserved for user definition are for programs 132 for which hot key symbols have not been set yet.

Figure 7A:
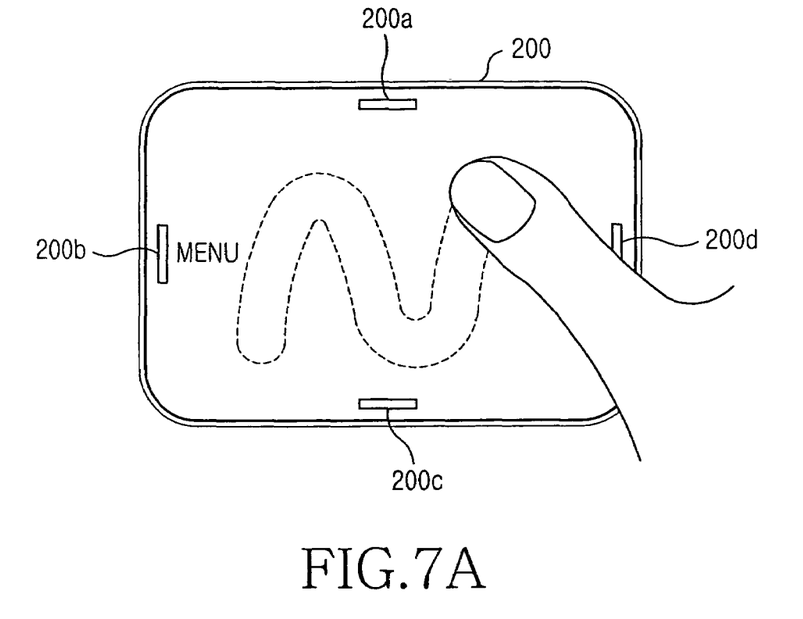
FIG. 7A illustrates user drawing of a symbol representing a sign command in a user interface of the preferred embodiment of the present invention.

FIG. 7A illustrates a user drawing of a symbol representing a sign command in the user interface 200. The sign command is for MEMO according to the program execution table 134 illustrated in FIG. 6. It is preferred that the controller 110, sensing a figure represented by the sign command, determines whether the figure falls within a predetermined matching range in comparing the figure with the symbols in the program execution table. Upon sensing the sign command indicating MEMO, the controller 110 compares a figure represented by the sign command with the symbols of the program execution table 134. If the figure falls within the predetermined matching range, the controller 110 considers that the sign command indicates MEMO. The controller 100 then invokes the MEMO program from the storage 130.

In accordance with the present invention, the user interface 200 includes a MENU key 200*b* for displaying details of the invoked program, and an OK key 200*c* for updating information for a selected menu. Those keys 200*b* and 200*c* co function as scroll keys, with keys 200*a* and 200*d*, to move a cursor after the program is invoked.

Figure 7B:
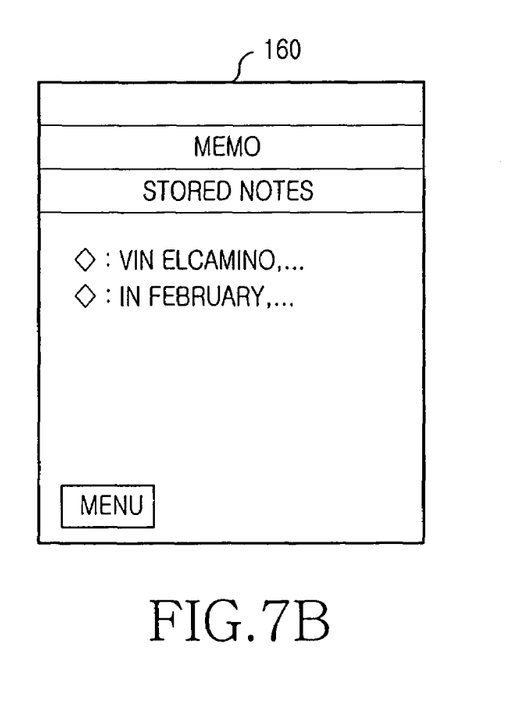
FIG. 7B illustrates program invocation by the sign command of the preferred embodiment of the present invention illustrated in FIG. 7A.

FIG. 7B illustrates a program invoked by the sign command illustrated in FIG. 7A. Referring to FIG. 7B, the operation state of the MEMO program is displayed on the LCD module 160. When the MEMO program is initially invoked, its appellation is displayed along with part of existing notes on the display module 160. To allow the user to view details about the MEMO program, "MENU" is alerted for the user to press the MENU key 200*b*. Thus, a program linked to a symbol set for the program is more easily, more rapidly invoked by a sign command represented by the symbol.

Figure 8:
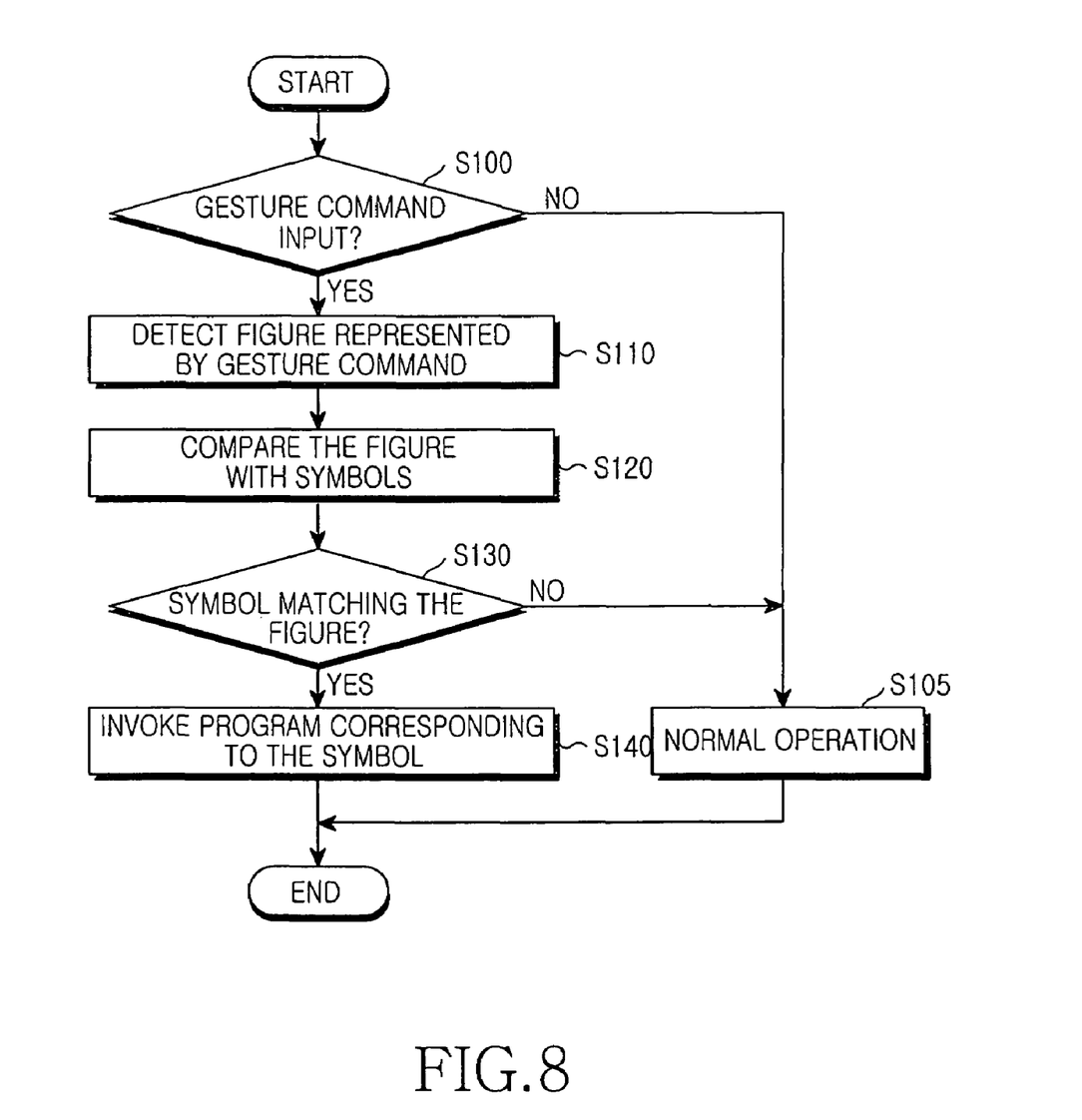
FIG. 8 is a flowchart illustrating a program invoking method using the portable terminal according to the preferred embodiment of the present invention.

FIG. 8 is a flowchart illustrating a program invoking method using the portable terminal according to the present invention, the controller 110 determines whether a sign command has been received from the user interface 200 in step S100. If the sign command has not been received, the controller 110 performs a normal operation in step S105.

Upon receipt of the sign command, the controller 110 detects a figure represented by the sign command in step S110. Preferably, the controller 110 stores the figure temporarily. In step S120, the controller 110 compares the figure with the symbols in the program execution table 134 stored in the storage 130. Preferably, the controller 110 performs the matching step S120 after a predetermined object that wrote the sign command is detached from the user interface 200. If a key is selected from the main housing 300 before the object is detached from the user interface 200, the controller 110 preferably deletes the figure from the storage 130 and performs an operation corresponding to the selected key.

In step S130, the controller 110 determines whether there is any symbol matching the figure. If no symbol matches the figure, the controller 110 performs the normal operation in step S105. On the other hand, if a symbol matches the figure, the controller 110 invokes a program linked to the symbol in step S140. This program invoking method by a sign command facilitates program selection and operation.

While it has been described that a single program execution table 134 is present in the. storage 130, it can be further contemplated that a plurality of program execution tables 134 are formed and a program execution table having a symbol representing a sign command for a particular program is selected among the program execution tables. Therefore, a different program can be operated using the same symbol according to a program execution table.

While symbols representing programs are preset in the embodiment of the present invention, these symbols can be user defined in accordance with individual user's wishes. This feature attracts more interest in running programs using hot key symbols and prevents unauthorized use of the portable terminal.

Instead of using a touch pad or touch screen for generating a sign command, a membrane can be inscribed with an image of the sign command that will be enabled by the particular key and coated on the keys of an existing portable terminal in order to realize both the traditional key function and the sign command-based program operation function. In this case, the controller 110 may recognize a sign command or a key input signal depending on pressure applied on the membrane.

In the case of a portable terminal coated with a membrane, upon receipt of a sign command stroked on the membrane in step S100, the controller 110 stores the sign command in the storage 136. In steps 110, 120 and 130, the controller 136 determines whether a symbol matching the sign command exists in the program execution table 134. In the absence of the symbol, the controller 110 deletes the sign command from the storage and proceeds to step S105.

On the other hand, if a key input signal and a sign command are simultaneously received, that is, the key input signal is generated before the sign command is completely written, the controller 110 performs an operation corresponding to the key input signal before processing the sign command.

In accordance with the present invention as described above, symbols are linked to programs and a program is invoked by a sign command represented by a symbol corresponding to the program. As a result, program selection and operation becomes easy and simple and there is no need for checking menu transitions when selecting a program.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable terminal comprising:
   a storage for storing programs and symbols linked to the programs;
   a user interface for sensing an external contact;
   a controller for detecting a figure represented by a signal sensed at the user interface according to a path in which the external contact is made and, in the presence of a symbol matching the figure, invoking a program corresponding to the symbol from the storage; and
   a display for displaying the symbol linked to the program for a predetermined time after the program has been invoked and thereafter displaying the operation state of the program.

2. The portable terminal of claim 1, wherein the symbols are mapped to the appellations of the programs in a program execution table.

3. The portable terminal of claim 2, wherein the storage further comprises a plurality of program execution tables.

4. The portable terminal of claim 3, wherein the symbols listed in the program execution tables are user-defined.

5. The portable terminal of claim 1, wherein the user interface is a touch pad.

6. The portable terminal of claim 1, wherein the user interface is a touch screen.

7. The portable terminal of claim 1, wherein the user interface is a membrane coated on keys for key input, for sensing the external contact.

8. The portable terminal of claim 1, wherein the display displays the operation state of a program invoked by the controller, and the controller controls the display to display a symbol linked to the program for a predetermined time and then invokes the program.

9. The portable terminal of claim 1, wherein upon receipt of a sign command represented by a symbol linked to a different program from the user interface during an ongoing program, the controller stores information about the operation state of the ongoing program and data generated from the ongoing program in the storage and runs the different program.

10. The portable terminal of claim 1, wherein the controller determines whether the figure is within a predetermined matching range of the symbol to check whether the figure matches the symbol.

11. A program invoking method in a portable terminal, comprising the steps of:
   (a) determining whether an external contact has been sensed;
   (b) detecting a figure represented by a sensed signal upon sensing the external contact according to a path in which the external contact is made;
   (c) comparing the figure with symbols linked to stored programs;
   (d) invoking a program corresponding to a symbol from the storage if the symbol matches the figure; and
   (e) displaying the symbol linked to the program for a predetermined time after the program has been invoked and thereafter displaying the operation state of the program.

12. The program invoking method of claim 11, wherein the symbols are mapped to the appellations of the programs in a program execution table.

13. The program invoking method of claim 12, wherein the symbols are listed in a plurality of program execution tables.

14. The program invoking method of claim 13, wherein the symbols listed in the program execution tables are user-defined.

15. The program invoking method of claim 11, further comprising the step of, upon receipt of a sign command represented by a symbol linked to a different program from the user interface during the ongoing program in step (d), storing information about the operation state of the ongoing program and data generated from the ongoing program in the storage and invoking the different program.

16. The program invoking method of claim 11, wherein it is determined whether the figure falls within a predetermined matching range of the symbol in step (c).

17. The program invoking method of claim 11, further comprising the steps of storing the figure after step (d), and deleting the figure if no symbols match the figure.

* * * * *